R. N. INK.
TRAP.
APPLICATION FILED MAY 29, 1916.
1,196,694.
Patented Aug. 29, 1916.
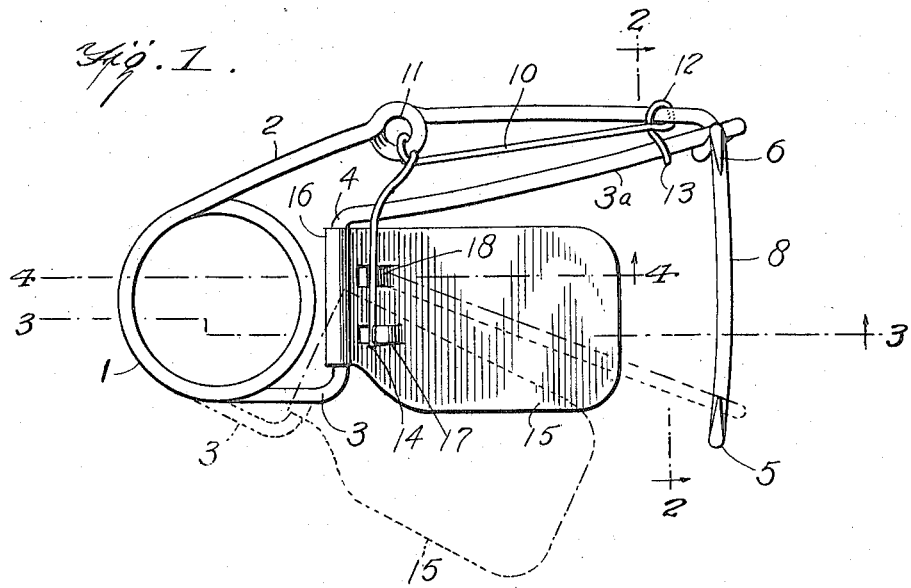
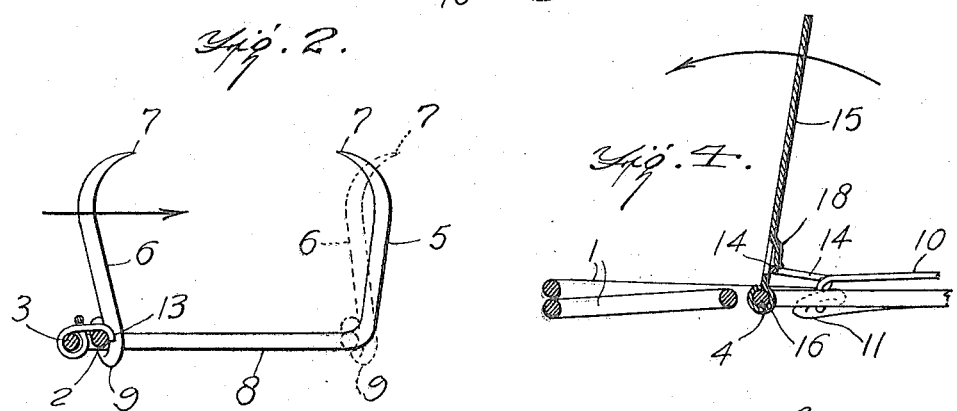
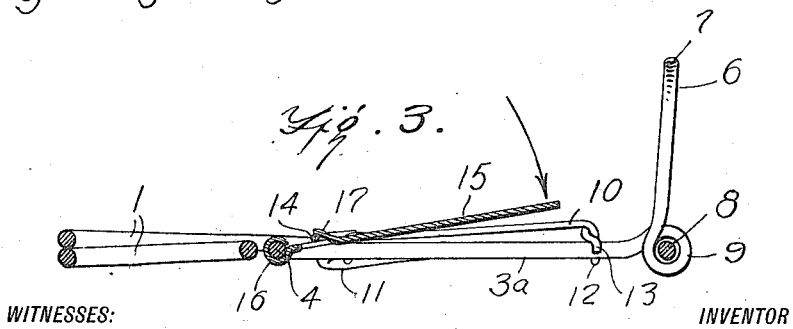
WITNESSES:
INVENTOR
ROLLA N. INK,
BY
Munn & Co.
ATTORNEYS

UNITED STATES PATENT OFFICE.

ROLLA N. INK, OF SAN DIEGO, CALIFORNIA.

TRAP.

1,196,694.  Specification of Letters Patent.  Patented Aug. 29, 1916.

Application filed May 29, 1916. Serial No. 100,533.

*To all whom it may concern:*

Be it known that I, ROLLA N. INK, a citizen of the United States, and a resident of San Diego, in the county of San Diego and State of California, have invented a new and useful Improvement in Traps, of which the following is a full, clear, and exact description.

My invention is an improvement in traps, and has for its object to provide a simple, inexpensive device of the character specified capable of use in runs for rats and the like, or in any desired position, wherein a pair of resilient jaws is provided, together with a latch for holding them in operative position, and a bait pan having catches for holding the latch in operative position when the pan is horizontal or vertical.

In the drawings, Figure 1 is a top plan view of the improved trap, and Figs. 2, 3 and 4 are sections on the lines 2—3, 3—3 and 4—4 respectively, of Fig. 1, each view looking in the direction of the arrows adjacent to the lines.

In the present embodiment of the invention, the trap is composed of a single piece of wire, bent to form a coil 1 with arms 2 and 3 extending tangentially from the coil. The arm 3 as shown is off-set toward the arm 2, the off-set portions 3ª being connected by an integral connection 4, and each arm is provided at its outer end with upstanding jaws 5 and 6 respectively, each jaw having at its upper end a pointed spur or lug 7 which is adapted to impale the animal.

The jaw 5 is connected to the arm 2 by an angular portion 8 which extends inwardly toward the arm 3 at right angles to the arm 2, the arms 2 and 3 being so arranged that the jaws 5 and 6 will normally contact through the resiliency of the arms. The arm 3 is provided at the junction of the portion 3ª and the jaw 6 with an eye 9 which embraces the angular portion 8 of the arm 2, and slides on the said portion, thus acting as a guide for the movement of the arm 3ª and insuring that the jaws 5 and 6 will register at all times.

A latch member is provided for holding the free end of the arm 3 in contact with the free end of the arm 2, this being the position of the parts when the trap is set. The latch member is formed from wire having a body portion 10, which is connected to an eye 11 formed in the arm 2 intermediate its ends, the wire 10 being connected to the eye by bending the said wire around the eye as shown. One end of the wire 10 is bent around the arm 2 near its connection with the portion 8, as indicated at 12, and the extremity of the said end of the wire is adapted to overlie the arm 3 when the trap is set, as shown in Figs. 1 and 2 of the drawings. This extremity 13 is bent slightly downward to form a shallow hook for engaging the arm 2 to hold it in set position.

The opposite end 14 of the wire is bent to lie across the arm 3 approximately parallel to the connection 4, and a bait pan 15 is hinged to the connection 4. The bait pan is provided at one end with a bearing 16 which is journaled on the integral connection 4, and the said pan is provided near the bearing with struck-up lugs or catches 17 and 18 respectively, one of the said catches extending from one face of the pan, as shown in Fig. 4, and the other from the opposite face of the pan as shown in Fig. 3.

In operation, the trap is set by pressing the arm 3 toward the arm 2, as indicated in full lines in Fig. 1, the said arms being grasped from below. The hook 13 is engaged over the arm 20 as shown in Fig. 2, and the other end 14 of the latch member is engaged with one of the lugs 17 or 18, depending upon the position occupied by the pan. If the trap is to be sprung by the animal running over the pan or attempting to take bait from the upper face of the pan, as for instance when the trap is intended for rats or the like, the pan is arranged horizontally, as shown in Figs. 1 and 3, and the lug 18 is engaged with the end 14 of the latch member. When the animal presses down on the bait pan, the lug 17 will be disengaged from the end 14 of the latch member, thus permitting the hook 13 to disengage from the portion 3ª of the arm 3. The natural resiliency of the wire from which the trap is formed will then snap the jaw 6 toward the jaw 5, thus catching the animal between the spurs or lugs 7.

When the trap is set for moles or the like, to be sprung by the movement of the pan forwardly, the pan is arranged as shown in Fig. 4, the portion 14 of the latch being engaged with the lug 18. Now, when the animal pushes against the pan, the trap will be sprung, the portion 14 of the latch member being disengaged from the lug 18, and the jaw 6 will be thrown forcibly toward the jaw 5, catching the animal between the jaws and between the pointed spurs 7.

The improved trap consists of but three pieces, the trap proper, the bait pan, and the latch member or trip rod. It may be set without any danger of accident to the operator, since the setting is done from below, that is at the opposite side from the gripping jaws.

What I claim is:

1. A trap comprising a wire bent to form a coil and arms, one arm being off-set laterally toward the other arm at the end remote from the coil, and the other arm having at its outer end an angular portion approximately parallel with the connection between the off-set portions of the other arm, said first named arm having an eye running upon the angular portion, and having an upstanding jaw at the eye, the other arm having an upstanding jaw at the end of the angular portion and serving as a stop for limiting the movement of the jaw of the first named arm toward the said jaw of the angular portion, a bait pan hinged to the connection between the off-set portions of the first named arm, a trip rod supported by the other arm and having a hook for engaging over the off-set arm to hold the said arm at its free end in contact with the outer end of the other arm, the trip rod having a portion extending transversely of the bait pan, and the bait pan having a lug for engaging the trip rod when the bait pan is in vertical or horizontal position.

2. A trap comprising a pair of resilient arms, said arms being connected at one end and normally diverging at the other, one arm having an angular portion at the said other end, and the other arm having an eye sliding on the angular portion, and the arms having coöperating jaws, a bait pan hinged to the arm having the eye, a releasable trip rod in connection with the arm having the angular portion and adapted to engage over the other arm to hold the free end thereof in contact with the first mentioned arm, the bait pan having a catch for engagement by the trip rod.

ROLLA N. INK.

Witnesses:
S. J. INK,
A. L. MULLER.

Copies of this patent may be obtained for five cents each, by addressing the "Commissioner of Patents, Washington, D. C."